US011108838B2

(12) United States Patent
Long et al.

(10) Patent No.: US 11,108,838 B2
(45) Date of Patent: Aug. 31, 2021

(54) METHOD, USER EQUIPMENT AND APPLICATION SERVER FOR ADDING MEDIA STREAM OF MULTIMEDIA SESSION

(71) Applicant: Huawei Technologies Co., Ltd., Shenzhen (CN)

(72) Inventors: Shuiping Long, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/883,608

(22) Filed: May 26, 2020

(65) Prior Publication Data
US 2020/0396271 A1 Dec. 17, 2020

Related U.S. Application Data

(63) Continuation of application No. 14/751,356, filed on Jun. 26, 2015, now Pat. No. 10,681,100, which is a
(Continued)

(30) Foreign Application Priority Data

Aug. 17, 2007 (CN) .......................... 200710146727.0

(51) Int. Cl.
*G06F 15/16* (2006.01)
*H04L 29/06* (2006.01)
*H04W 8/18* (2009.01)

(52) U.S. Cl.
CPC .......... *H04L 65/60* (2013.01); *H04L 65/1006* (2013.01); *H04L 65/1016* (2013.01);
(Continued)

(58) Field of Classification Search
CPC . H04L 65/60; H04L 65/1006; H04L 65/1016; H04L 65/1089; H04L 65/1093; H04W 8/183
(Continued)

(56) References Cited

U.S. PATENT DOCUMENTS 7,953,118 B2  5/2011  Krantz et al.
7,969,986 B2 * 6/2011  Yanai .................. H04L 65/1069
                                                    370/395.2
(Continued)

FOREIGN PATENT DOCUMENTS

CN         1842084 A      10/2006
CN         1960526 A       5/2007
CN         1985489 A       6/2007

OTHER PUBLICATIONS

J. G. Adamek, E. H. Henrikson, H. A. Lassers, A. Y. Lee and R. B. Martin, "Services and technical considerations for the wireless IP multimedia subsystem," in Bell Labs Technical Journal, vol. 7, No. 2, pp. 91-104, 2002, doi: 10.1002/bltj.10007. (Year: 2002).*
(Continued)

*Primary Examiner* — Melvin H Pollack
(74) *Attorney, Agent, or Firm* — Conley Rose, P C.

(57) ABSTRACT

A method, user equipment (UE) and application server for adding media stream of multimedia session. A UE1 establishes a multimedia session with a UE2, receives a media stream adding request directed at the multimedia session of the UE1; the media stream adding request includes an identity of a UE3 and the media type of the media flow requested to be added; the UE3 is controlled to establish a media stream of the media type with the UE2. Therefore, adding the media stream on the UE3 is realized, and the user may realize the multimedia session with the peer end through multiple UEs, thereby avoiding the inconvenience that the media stream can only be added to the two parties
(Continued)

in the session and living up to the users' diversified requirements on the multimedia services.

20 Claims, 4 Drawing Sheets

Related U.S. Application Data continuation of application No. 12/507,629, filed on Jul. 22, 2009, now Pat. No. 9,071,610, which is a continuation of application No. PCT/CN2008/071216, filed on Jun. 6, 2008.

(52) U.S. Cl.
CPC ...... *H04L 65/1089* (2013.01); *H04L 65/1093* (2013.01); *H04W 8/183* (2013.01)

(58) Field of Classification Search
USPC ......................................................... 709/219
See application file for complete search history.

(56) References Cited

U.S. PATENT DOCUMENTS

| | | | |
|---|---|---|---|
| 8,041,800 B2* | 10/2011 | Gilfix | H04L 67/141 709/223 |
| 8,060,565 B1* | 11/2011 | Swartz | G10L 13/00 709/206 |
| 8,073,956 B2 | 12/2011 | Khanchandani et al. | |
| 8,094,664 B2* | 1/2012 | Kuure | H04L 69/40 370/395.2 |
| 8,259,709 B2 | 9/2012 | Skog et al. | |
| 8,325,707 B2 | 12/2012 | Quah et al. | |
| 8,473,617 B2 | 6/2013 | Bennett et al. | |
| 8,526,447 B1 | 9/2013 | Kumarasamy et al. | |
| 8,543,705 B2 | 9/2013 | Cagenius | |
| 8,549,151 B2 | 10/2013 | Stokking et al. | |
| 8,554,940 B2 | 10/2013 | Jennings et al. | |
| 8,577,953 B2 | 11/2013 | Roche et al. | |
| 8,639,820 B2* | 1/2014 | Song | H04M 7/00 709/227 |
| 8,682,975 B2* | 3/2014 | Vilis | H04L 63/101 709/205 |
| 8,719,342 B2* | 5/2014 | Mutikainen | H04L 12/1818 709/204 |
| 8,775,511 B2* | 7/2014 | Vernon | H04L 65/1083 709/204 |
| 8,817,607 B2 | 8/2014 | Song et al. | |
| 8,825,027 B2* | 9/2014 | Sung | H04W 72/005 455/414.3 |
| 8,856,860 B2* | 10/2014 | Grayson | H04L 67/322 726/1 |
| 8,972,594 B2* | 3/2015 | Srinivasan | G06F 15/173 709/230 |
| 9,026,117 B2 | 5/2015 | Chakravadhanula et al. | |
| 9,036,620 B2 | 5/2015 | Procopio et al. | |
| 9,042,378 B2* | 5/2015 | Rasanen | H04L 29/06027 370/354 |
| 9,060,047 B2* | 6/2015 | Bhatia | H04L 47/80 |
| 9,065,664 B2* | 6/2015 | Pearce | H04M 3/568 |
| 9,148,459 B2* | 9/2015 | Rossler | H04W 8/186 |
| 9,210,202 B2* | 12/2015 | Bhaskaran | H04W 76/45 |
| 9,232,258 B2 | 1/2016 | Dua | |
| 9,241,020 B2* | 1/2016 | Poikselka | H04L 65/4076 |
| 9,258,367 B2* | 2/2016 | Kyzivat | H04L 67/143 |
| 9,264,467 B2 | 2/2016 | Sung et al. | |
| 9,326,016 B2 | 4/2016 | Grasset | |
| 9,369,496 B2* | 6/2016 | Shaheen | H04W 8/04 |
| 9,392,035 B1 | 7/2016 | Jones et al. | |
| 9,602,880 B2 | 3/2017 | Ansari et al. | |
| 9,614,876 B2* | 4/2017 | Witzel | H04L 65/104 |
| 9,654,642 B2 | 5/2017 | Niemi | |
| 9,794,307 B2* | 10/2017 | Allen | H04W 4/10 |
| 9,876,670 B2* | 1/2018 | Richardson | H04L 65/1069 |
| 2006/0126648 A1 | 6/2006 | Park et al. | |
| 2006/0218291 A1 | 9/2006 | Zhu et al. | |
| 2007/0073892 A1 | 3/2007 | Laurila et al. | |
| 2007/0180135 A1 | 8/2007 | Kenrick et al. | |
| 2007/0274301 A1 | 11/2007 | Mutikainen | |
| 2008/0195738 A1* | 8/2008 | Luo | H04L 12/189 709/227 |
| 2010/0093346 A1 | 4/2010 | Song et al. | |
| 2010/0205308 A1 | 8/2010 | Song et al. | |
| 2010/0223348 A1* | 9/2010 | Przybysz | H04L 65/1069 709/206 |
| 2010/0268761 A1* | 10/2010 | Masson | H04L 51/10 709/203 |
| 2011/0007737 A1* | 1/2011 | Bultinck | H04L 65/60 370/355 |
| 2012/0278384 A1 | 11/2012 | Synnergren et al. | |
| 2013/0036308 A1 | 2/2013 | Buch et al. | |
| 2019/0215561 A1 | 7/2019 | Dua | |

OTHER PUBLICATIONS

A. Johnston, O. Levin, "Session Initiation Protocol (SIP) Call Control—Conferencing for User Agents," RFC 4579, Aug. 2006 (Year: 2006).*
H. Schulzrinne and J. Rosenberg, "The Session Initiation Protocol: Internet-centric signaling," in IEEE Communications Magazine, vol. 38, No. 10, pp. 134-141, Oct. 2000, doi: 10.1109/35.874980. (Year: 2000).*
Ron Shacham, Henning Schulzrinne, Srisakul Thakolsri, and Wolfgang Kellerer. 2007. Ubiquitous device personalization and use: The next generation of IP multimedia communications. ACM Trans. Multimedia Comput. Commun. Appl. 3, 2 (May 2007), 12-es. DOI:https://doi.org/10.1145/1230812.1230818 (Year: 2007).*
M. Handley, V. Jacobson, C. Perkins, SDP: Session Description Protocol, RFC 4566, Jul. 2006 (Year: 2006).*
B. Goode, "Voice over Internet protocol (VoIP)," in Proceedings of the IEEE, vol. 90, No. 9, pp. 1495-1517, Sep. 2002, doi: 10.1109/JPROC.2002.802005. (Year: 2002).*
"5.7 Application servers: providing services to users," XP002614635, Oct. 2004, 24 pages.
Johnston, A, et al., "Session initiation protocol service examples," draft-itef-sipping-service-examples-13, XP15051708, Jul. 16, 2007, 162 pages.
Shacham, R., et al., "The Virtual Device Expanding Wireless Communication Services through Service Discovery and Session Mobility," 2005, 9 pages.
Shacham, R., et al., "Session Initiation Protocol (SIP) Session Mobility," draft-shacham-sipping-session-mobility-02, Feb. 2006, 32 pages.
"3rd Generation Partnership Project; Technical Specification Group Services and Architecture; Feasibility Study on Multimedia Session Continuity; Stage 2; (Release 8)," 3GPP TS 23.893, V0.1.1, Aug. 2007, 15 pages.
"3rd Generation Partnership Project; Technical Specification Group Services and System Aspects; Voice Call Continuity (VCC) between Circuit Switched (CS) and IP Multimedia Subsystem (IMS); Stage 2 (Release 7)," 3GPP TS 23.206, V7.3.0, Jun. 2007, 36 pages.

* cited by examiner

METHOD, USER EQUIPMENT AND APPLICATION SERVER FOR ADDING MEDIA STREAM OF MULTIMEDIA SESSION

CROSS-REFERENCE TO RELATED APPLICATIONS

This application is a continuation of U.S. patent application Ser. No. 14/751,356, filed on Jun. 26, 2015, which is a continuation of U.S. patent Ser. No. 12/507,629, filed on Jul. 22, 2009, now U.S. Pat. No. 9,071,610. The U.S. patent Ser. No. 12/507,629 is a continuation of International Patent Application No PCT/CN2008/071216, filed on Jun. 6, 2008, which claims priority to Chinese Patent Application No. 200710146727.0, filed on Aug. 17, 2007. All of the aforementioned applications are hereby incorporated by reference in their entireties.

FIELD OF THE INVENTION

The present invention relates to the communication field, and in particular to a method, user equipment and application server for adding media stream of multimedia session.

BACKGROUND OF THE INVENTION

Along with the development of the radio communication service, the users are more and more demanding on the service quality and category, which gives rise to many value-added services. These services bring convenience to people's life and, at the same time, meet their diversified demands.

At present, in a multimedia session, two parties of the ongoing session are allowed to increase the media stream, for example, when a conversation goes on, the video phone becomes possible by adding the video media stream.

The existing method for adding the media stream of multimedia session includes the following:
A first user equipment (UE1) establishes a multimedia session with a second user equipment (UE2).
The UE1 sends a new media stream adding request to the UE2.
The UE2 accepts the adding request;
Between the UE1 and the UE2 transmits the added media stream.

It is understandable that the interacting of the messages between the UE1 and the UE2 needs to pass through the call control equipment.

During the research and implementation of the prior art, the inventor finds the following drawbacks:

Although the above mentioned method of adding the media stream may realize adding a media stream during the multimedia session, the adding of the media stream is between the two parties of the session and a third user equipment (UE3) cannot be added to receive and transmit the added media stream. In the real situation, however, it is very likely that one user owns more than one UE, each having its own strong points. For example, one user owns two UEs at the same time; one is good in voice quality, but does not support video or supports but with a poor effect, while the other has powerful video function, but is poor in voice quality. If the existing method is adopted to add the media stream, the respective strong points of the two UEs cannot be brought into play. This limitation brings inconvenience to users of the multimedia service and makes it impossible to meet users' requirements on diversified multimedia service.

SUMMARY OF THE INVENTION

Embodiments of the present invention provide a method, user equipment (UE) and application server for adding media stream, which may realize adding a media stream on the third user equipment, UE3, so that the user may enter into a multimedia session with the peer end.

An embodiment of the present invention provides a method for adding a media stream of a multimedia session, including the following.

A UE1 establishes a multimedia session with a UE2 under the control of an application server.

The UE1 sends to the application server a media stream adding request directed at the multimedia session, where the media stream adding request includes an identity of a UE3 and a media type of the media stream requested to be added.

The UE3 establishes a media stream of the media type with the UE2 under the control of the application server.

An embodiment of the present invention provides a method for adding the media stream of the multimedia session, including the following.

A UE1 establishes a multimedia session with a UE2 under the control of an application server.

A UE3 sends to the application sever a media stream adding request for adding the media stream with the UE2, where the media stream adding request includes a media type of the media stream to be added.

Media stream of the media type is established between the UE3 and the UE2 under the control of the application server.

An embodiment of the present invention provides a user equipment, including:
a session establishing unit, adapted to establish a session with the UE2 under the control of the application server; and
a media adding request sending unit, adapted to send a media stream adding request directed at the multimedia session to the application server, where the media adding request includes the identity of the UE3 and the media type of the media stream requested to be added.

An embodiment of the present invention provides an application server, including:
a session control unit, adapted to control the UE1 to establish a multimedia session with the UE2;
a receiving unit, adapted to receive a media stream adding request of the UE1 which is directed at the multimedia session, where the media stream adding request includes the ID of the UE3 and the media type of the media stream requested to be added; and
a media stream adding control unit, adapted to control the UE3 to establish the media stream of the media type with the UE2.

An embodiment of the present invention provides a user equipment, including:
a media adding request sending unit, adapted to send the request for adding the media stream between the application server and the UE2; where the request includes the type of the added media stream; and
a media stream establishing unit, adapted to establish the added media stream of the requested media type with the UE2 under the control of the application server.

An embodiment of the present invention provides an application server, including:
a session control unit, adapted to control the UE1 to establish a multimedia session with the UE2;
a receiving unit, adapted to receive a media stream adding request sent by the UE3 to add the media stream between the UE3 and the UE2, where the request includes the media type of the added media stream; and a media stream adding unit, adapted to control the UE3 to establish a media stream of the media type with the UE2.

In the embodiments of the present invention, the multimedia session is established between the UE1 and the UE2 under the control of the application sever; the UE1 sends to the application server a media stream adding request directed at the multimedia session, where the media stream adding request includes the identity of the UE3 and the media type of the requested media stream; the UE3 establishes the media stream of the media type with the UE2 under the control of the application server. Therefore, adding the media stream on the UE3 is realized, and the user may realize the multimedia session with the peer end through multiple UEs, thereby avoiding the inconvenience that the media stream can only be added to the two parties in the session and living up to the users' diversified requirements on the multimedia services.

DETAILED DESCRIPTION OF THE INVENTION

Embodiments of the present invention provide a method, user equipment and application server for adding media stream of multimedia session, applicable in the technical field of communication. The following is a detailed description of the method, user equipment and application server for adding media stream of multimedia session.

Figure 1:
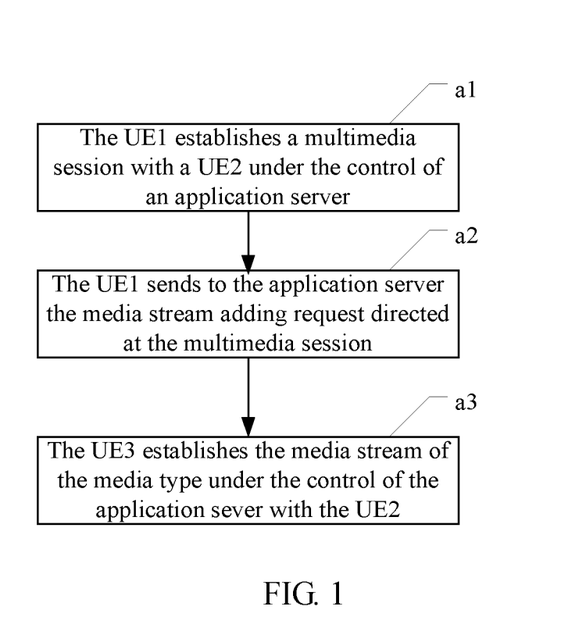
FIG. 1 is a flowchart showing a method for adding the media stream of the multimedia session in one embodiment of the present invention.
Figure 2:
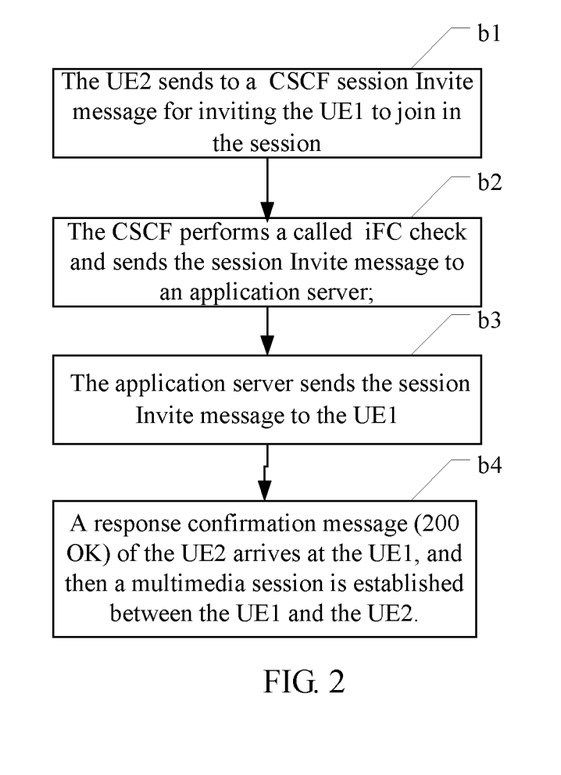
FIG. 2 is a flowchart showing that a multimedia session is established between a UE1 and the UE2 under the control of the application server in another embodiment of the present invention.

One embodiment of the present invention: A method for adding a media stream of a multimedia session. As shown in FIG. 1, the method includes the following:

Step a1: A UE1 establishes a multimedia session with a UE2 under the control of an application server;

In this embodiment, the process for establishing multimedia session between the UE1 and the UE2 under the control of the application server is in the following as illustrated in FIG. 2. The following example takes the UE2 as a call initiator.

Step b1: The UE2 sends to a Call Session Control Function, CSCF, a session Invite message for inviting the UE1 to join in the session;

Step b2: The CSCF performs a called initial Filter Criteria, iFC, check; after learning that the UE1 supports the media stream adding service, the CSCF sends the session Invite message to an application server;

Step b3: The application server sends the session Invite message to the UE1, where the session Invite message is forwarded to the UE1 via the CSCF;

Step b4: The UE1 sends a response message (200 OK) to the UE2, and then a multimedia session is established between the UE1 and the UE2.

It is understandable that, if the UE1 is the calling party, the process is basically the same as the above process with the following difference: if the Invite message for inviting the UE2 to join in the session sent by the UE1 arrives at the CSCF, the CSCF performs the calling iFC check; if it is learned that the UE1 supports the media stream adding service, then the session Invite message is sent to the application server, and then the session Invite message is forwarded via the CSCF to the UE2. The UE2 sends a response message (200 OK) to the UE1, and then a multimedia session is established between the UE1 and the UE2.

That a session is established between the UE1 and the UE2 under the control of the application server may also be realized in other ordinary methods, which may not be a limitation to the present invention.

Step a2: The UE1 sends to the application server the media stream adding request directed at the multimedia session, where the media stream adding request includes the identity of the UE3 and the media type of the media stream requested to be added;

Step a3: The UE3 establishes the media stream of the media type under the control of the application server with the UE2.

In an embodiment of the present invention, the process of establishing a media stream of the requested media type between the UE3 and the UE2 is as follows:

1. The application sever sends to the UE3 a session Invite message, where in the Session Invite, the address of the calling party may be the address of the application server or the identity of the UE2.

In an embodiment of the present invention, the identity of the UE may be an address, user name, nickname, etc; it is understandable that as long as it can identify the UE, and help locating the UE, it may be taken as the identity of the UE.

If the calling party in the multimedia session between the UE1 and the UE2 is the UE1, the address of the calling party is added into the identity of the application server; if the calling party of the multimedia session is the UE2, the address of the calling party is added into identity of the UE2.

2. The UE3 and the UE2 perform the media information negotiation directed at the media type under the control of the application server; the media negotiation is directed at the information of the media type, coding format that the two parties of the negotiation support, the port address of receiving and transmitting the media stream, etc. There may be multiple information interactions during the negotiation which adopts the conventional technical means and the specific negotiating process is not detailed here.

3. When the negotiation succeeds, the UE3 transmits the media stream of the media type to the UE2.

It is understandable that establishment of the media stream between the UE3 and the UE2 under control of the application server may adopt other conventional procedure of which the establishing method does not limit the present invention. In addition, the call connection between the application server and the UE2 may be reused, which saves the reestablishment of a new call connection.

It is also understandable that in step a2, the media stream adding request sent by the UE1 to the application server may be triggered by the UE1 under the operation of the user, or may be triggered when the UE1 receives the media adding request sent by the UE2, where the media adding request includes the media type of the added media stream.

In one embodiment of the present invention, a multimedia session is established between the UE1 and the UE2; the UE1 sends to the application server the media stream adding request directed at the multimedia session; the media stream adding request includes: the identity of the UE3 or the media type of the media stream requested to be added; the UE3 and the UE2 establish the media stream of the media type under the control of the application server. Since the media stream is added on the UE3, the user may enter into a multimedia session with the peer end. As a result, it is avoided that the media stream can only be added on the two parties of the session, which brings inconvenience to the user; therefore, the users' requirements on diversified multimedia service are met.

Those skilled in the art may understand that all or part of the process in the above embodiments may be realized in the way of ordering the related hardware by the program. The program may be stored in computer readable storage medium; and when being executed, the program includes the following steps:

The UE1 establishes multimedia session with the UE2 under the control of the application server;

The UE1 sends to the application server a media stream adding request directed at a multimedia session; the media stream adding request includes the identity of the UE3 and the media type of the requested media stream;

The UE3 establishes with the UE2 the media stream of the media type under the control of the application server.

The above mentioned storage media may be read-only memory, disk or compact disk.

One embodiment of the present invention

Figure 3:
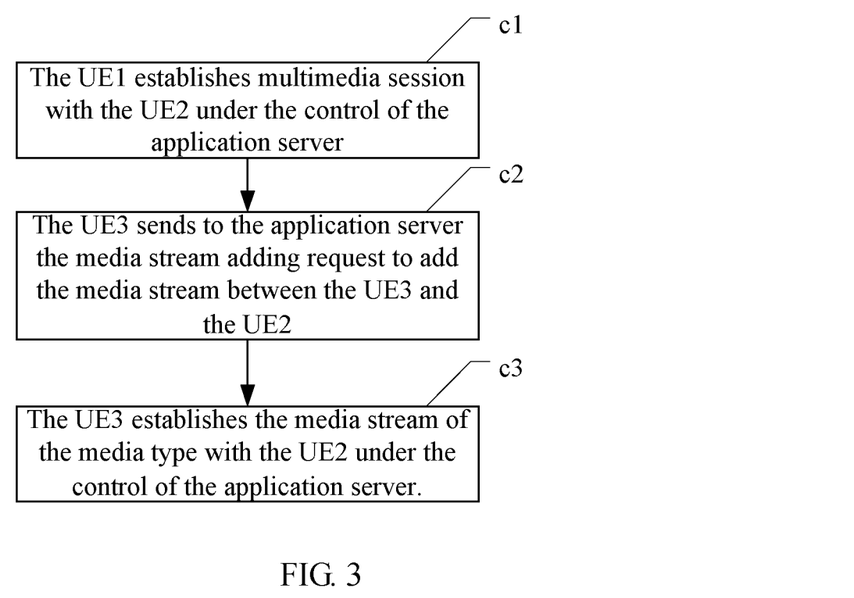
FIG. 3 is a flowchart showing a method for adding the media stream of the multimedia session in one embodiment of the present invention.

A media stream adding method of multimedia session, as shown in FIG. 3, includes the following steps:

Step c1: The UE1 establishes multimedia session with the UE2 under the control of the application server.

For the specific establishing process of establishing the multimedia session, refer to the step a1 in the proceeding embodiment.

Step c2: The UE3 sends to the application server a media stream adding request to add the media stream between the UE3 and the UE2, where the request includes the added media type of the media stream.

In the embodiment of the present invention, the media stream adding request includes the identity of the UE1 to indicate to the application server which UE needs to be added with the media stream in the session.

It is understandable that the identity of the UE3 may help the application server to identify which UE needs to be added with the media stream.

The identity of the UE3 is its global routable address; if the UE1 and the UE2 are user terminals registered in an IM Public user identity, IMPU, the UE1 that associates with the UE3 may be searched out according to the IMPU of the UE3.

The present IP multimedia subsystem, IMS, supports multiple UEs to register in an IP IMPU, i.e., one-user-multiple-terminals. In the application, the IMS is required to differentiate the information sources and send the information to one specified UE that registers in the IMPU and this is feasible with the Globally Routable User Agent (UA) URIs, GRUU. For example, When the UE registers with the IMS, the UE sends out the GRUU allocation request, and the allocation request includes: sip:bob@3gpp.org;gruu;opaque="urn:uuid: f81d4fae-7dec-11d0-a765-00a0c91e6bf6", where the "bob@3gpp. org;gruu" is user's IMPU; "opaque" identifies one UE of multiple UEs; "S-CSCF" is to return "bob@3gpp.org;gr=kjh29x97us97d", where "gr" parameter is selected by CSCF to identify the UE.

As can be seen from the above, under the situation of one user two terminals, the UEs of the user are registered with the same IMPU; while, in the process of IMS registration, GRUU is allocated to identify individual UEs. In the embodiments of the present invention, the UE3 and the UE2 sharing the IMPU also fall into the situation of one-user-multiple-terminals; therefore, after the application server receives the media stream adding request, it may search out the UE1 by the IMPU of the UE3.

It is understandable that the media stream adding request may also include the multimedia session identity, which identifies the session to be added with the media stream. In the IMS, the UE may be participating in more than one session at the same time, and through the above mentioned method, it is identifiable in which session of the UE the media stream is to be added.

Step c3: The UE3 establishes the media stream of the media type with the UE2 under the control of the application server. The process of establishing the media stream of the media type may refer to step a3 of the first embodiment.

It is understandable that before step c3, the following may be included.

The application server asks the UE1 for instructions whether to allow the UE3 to add the media stream of the media type; if yes, the UE1 confirms with the application server, and proceeds with step c3.

The difference between the second embodiment and the first embodiment lies in that the UE3 initiates the media stream adding request, which is applicable for more scenarios; therefore, more approaches are provided for the media stream transfer to facilitate the using of the user.

It is understandable to those of ordinary skill in the art that the whole or part of the steps in the above embodiments may be accomplished by a program ordering the related hardware. The program may be stored in a computer readable storage medium and may include the following steps when being executed:

The UE1 establishes a multimedia session with the UE2 under the control of the application server.

The UE sends to the application server a media stream adding request directed at a multimedia session; the media stream adding request includes the identity of the UE3 and the media type of the media stream requested to be added.

The UE3 establishes with the UE2 the media stream of the media type under the control of the application server.

The above mentioned storage medium may be a read-only memory, disk or compact disk.

Figure 4:
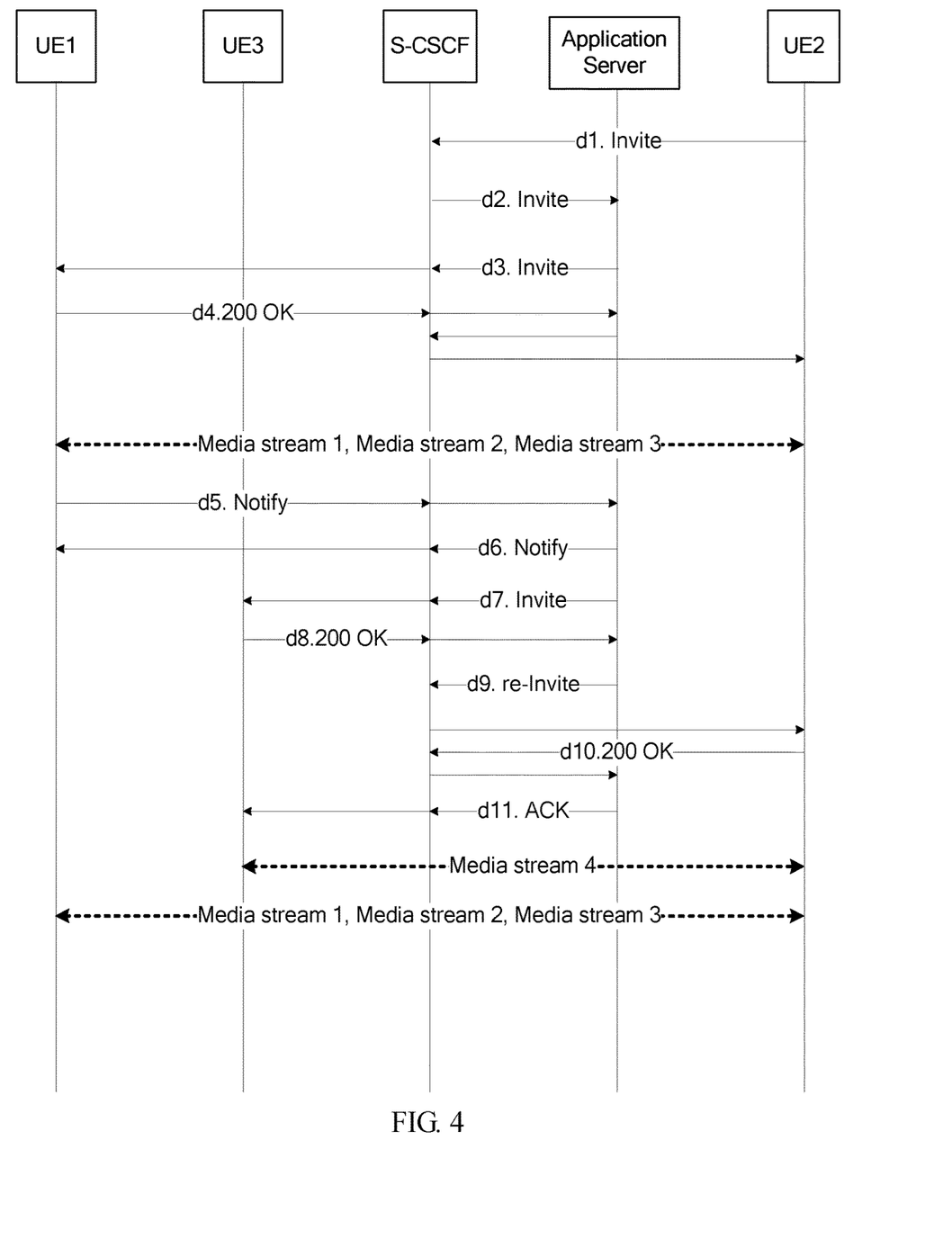
FIG. 4 is a signaling flowchart of realizing the method embodiment by adopting the SIP protocol in one embodiment of the present invention.

The following is an example of implementing the method in the first embodiment by adopting the SIP. In this example, supposing user Bob owns two terminals: the UE1 and the UE3, where both of the two UEs register with the IMS in a same public user identity "Bob@sipo.com", and the GRUU are respectively Bob@sipo.com;gr=erwiopue1 and Bob@sipo.com;gr=dfweyuiue3. The gr values are erwiopue1 and dfweyuiue3 to differentiate the UE1 and the UE3.

The signaling flow is as shown in FIG. 4, including the following steps:

Step d1: The UE2 sends an Invite message to S-CSCF to invite the UE1 to join in the multimedia session, where the Invite message includes Bob@sipo.com;gr=erwiopue1, Call-ID: 3456df0u, and the Call-ID is the calling identity to identify the current calling; and the Invite message further includes the media type that is requested to be established, which, in this embodiment, are audio, video, and real-time text messages.

Step d2: The S-CSCF performs the called iFC check on the UE1 and acquires that the UE1 supports the media stream transfer service, and then sends the Invite message to the application server, where the sent Invite message includes an added address of the S-CSCF and a dialog identifier parameter (dia-id); the added S-CSCF address is to facilitate the returning of the request to the S-CSCF by the application server when the process completes; the added dia-id is for the S-CSCF to differentiate the succeeding requests from the currently received request.

Step d3: The application server generates a new Invite message and sends the message to the UE1, where the Invite message includes the S-CSCF address and the dia-id; the Invite message is firstly sent to the S-CSCF, and then the S-CSCF identifies the calling request through the dia-id in the message and continues the iFC check; when the check is completed, the application server sends a calling request to the UE1.

Step d4: The UE1 sends a response message (200 OK) to the UE2, and then the UE1 establishes a call with the UE2 to start the multimedia call among media stream 1, media stream 2 and media stream 3.

Step d5: Under the control of the user Bob, the UE1 sends the media stream adding request to the application server; the media stream adding request is realized through the Subscribe message of the SIP; the Subscribe message includes the media stream type (m=4) wished to be added, i.e. media stream 4, and the identity of the UE3 of which the media stream is to be added, i.e. GRUU:Bob@sipo.com; gr=dfweyuiue3.

Step d6: The application server sends to the UE1 the media adding confirmation by adopting the Notify message of the SIP to answer the UE1.

It is understandable that since a calling has been established between the application server and the UE1, the sent media transfer request may be in the form of re-Invite or Update, and the corresponding response to be returned may adopt the 200 OK.

Step d7: The application server generates another new Invite message (Call-ID: 2876oj68, Route: scscf1; dia-id=8736yuhs) to send to the UE3; the Invite message is firstly sent to the S-CSCF, and the S-CSCF identifies the calling request through the dia-id, and send the calling request to the UE3; the application server may also send the media information about the media stream 4 of the UE3 through the calling request, and the information may include an IP address, a port, a coding format, etc.

In the process of establishing the multimedia session of steps d1-d4, if the session initiator is the UE1, the application server sets the address of the application server as the calling address in the Invite message and sends the calling request to the UE3. It is not supported by the present network that the application server sets the identity of the UE2 as the calling address; if, however, the application server sets the identity of the UE2 as the calling address, the application server initiates a calling request to the UE3 in place of the UE1, which may cause logic processing confusion at the application server and increase the processing complexity at the network side.

Step d8: The UE3 makes a 200 OK response.

Step d9: After receiving the 200 OK, the application server generates re-Invite or Update message, and through the message, the media information of the UE3 is sent to the UE2, so that the UE3 establishes media stream 2 with the UE2.

The re-Invite or Update message is used for the session re-negotiation, such as adding or deleting a media stream, or modifying the IP address of the media stream. It is understandable that the negotiation process may be repeated, but the specific times do not limit the present invention.

Step d10: The UE2 returns the acknowledgement message (200 OK) to accept the session negotiation request, where the acknowledgement message includes media information of the UE2.

Now, the user Bob establishes a multimedia call with the user Tom of the UE2 through the UE1 and UE3.

Step d11: The applications sever sends the media information of the UE2 through the ACK message to the UE3.

Now, the user Bob establishes a multimedia calling with the user Tom of the UE2 through the UE1 and UE3.

In FIG. 4, the dotted line represents the media stream transmitting state before and after the media stream transfer.

Figure 5:
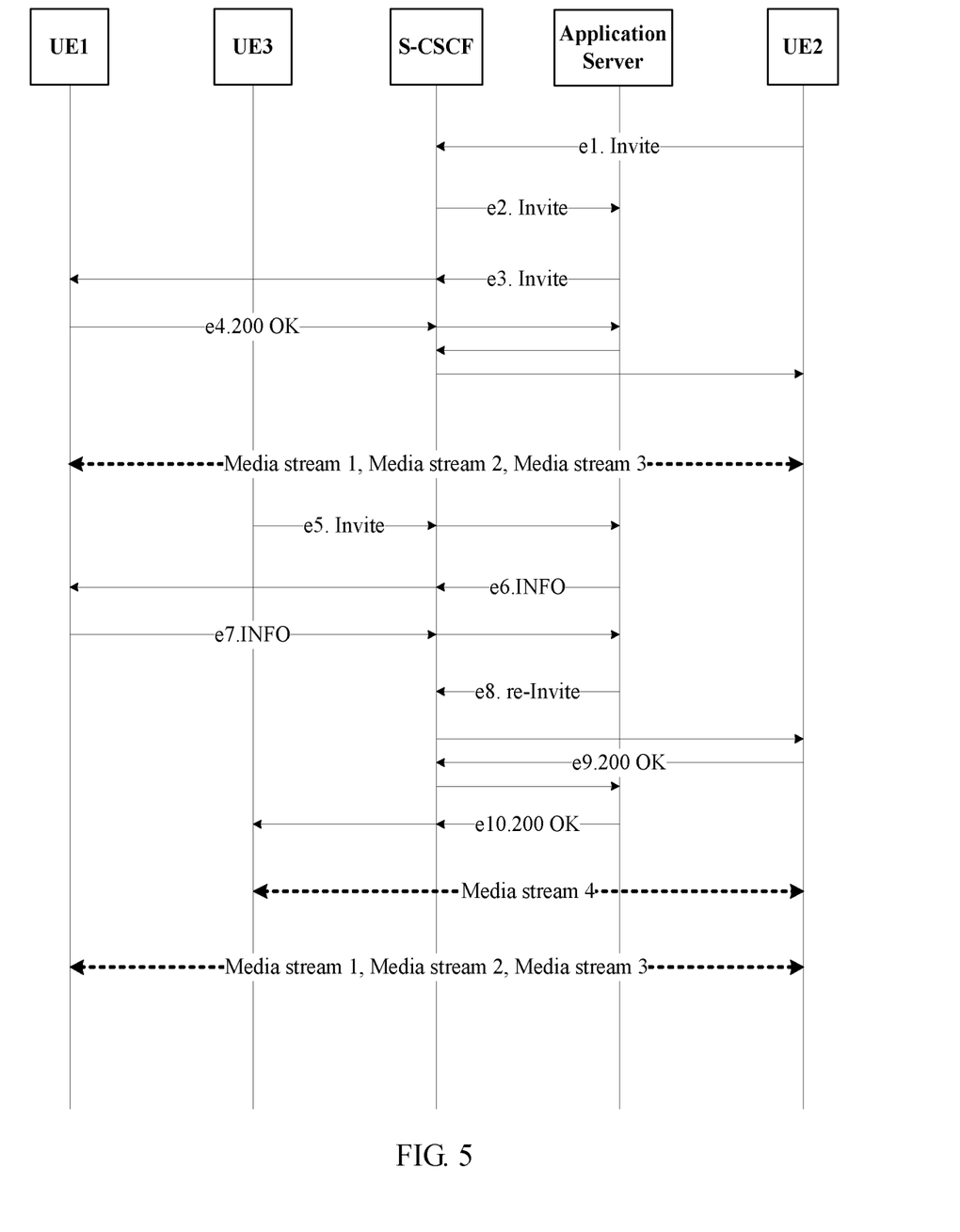
FIG. 5 is a signaling flowchart of realizing the method embodiment by adopting the SIP protocol in another embodiment of the present invention.

The following is an example of implementing the method in a second embodiment by adopting the SIP. In this example, supposing user Bob owns two terminals: the UE1 and the UE3, where both of the two UEs register with the IMS in a same public user identity "Bob@sipo.com", and the GRUU is respectively Bob@sipo.com;gr=erwiopue1 and Bob@sipo.com;gr=dfweyuiue3. The gr values are erwiopue1 and dfweyuiue3 to differentiate the UE1 and the UE3.

The signaling flow is as shown in FIG. 5, including the following steps:

Step e1: The UE2 sends an Invite message to S-CSCF to invite the UE1 to join the multimedia session, where the Invite message includes Bob@sipo.com;gr=erwiopue1, Call-ID: 3456df0u, and the Call-ID is the calling identity to identify the current calling; the Invite message further includes the media type that is requested to be established, which, in this embodiment, are audio, video, and real-time text messages.

Step e2: The S-CSCF performs the called iFC check on the UE1 and acquires that the UE1 supports the media stream transfer service, and then sends the Invite message to the application server, where the sent Invite message includes an added address of the S-CSCF and a dialog identifier parameter (dia-id); the added S-CSCF address is to facilitate the returning of the request to the S-CSCF by the application server when the process completes; the added dia-id is for the S-CSCF to differentiate the succeeding requests from the currently received request.

Step e3: The application server generates a new Invite message and sends the message to the UE1, where the Invite message includes the S-CSCF address and the dia-id; the Invite message is firstly sent to the S-CSCF, and then the S-CSCF identifies the calling request through the dia-id in the message and continues the iFC check; when the check is completed, the application server sends a calling request to the UE1.

Step e4: The UE1 sends a response message (200 OK) to the UE2, and the UE1 establishes a call with the UE2 to start the multimedia call among media stream 1, media stream 2 and media stream 3.

Step e5: The user Bob controls the UE3 to send a switching request of the media stream 2 to the application server, where the switching request is identified by the VDI/VDN; the application server searches out the session of the media to be transferred through the identity of the UE3 (Bob@sipo.com;gr=dfweyuiue3).

Step e6: The application server informs the UE1 through the INFO message that the UE3 requests the adding of the media stream 4.

Step e7: If receiving the media stream switching request, the UE1 responds to the request through INFO information.

Step e8: The application server generates re-Invite or Update message, and through the message, the media information of the UE3 is sent to the UE2.

Step e9: The UE2 receives the media information of the UE3 and returns the 200 OK to confirm.

Step e10: The application server sends the 200 OK to the UE3, and sends the media information of the UE2 to the UE3, so that the UE3 establishes the media stream 4 with the UE2.

The re-Invite or Update message is used for the session re-negotiation, such as adding or deleting media stream, or modifying the IP address of the media stream. It is understandable that the negotiation process may be repeated, but the specific times do not limit the present invention.

Now, the user Bob establishes a multimedia calling with the user Tom of the UE2 through the UE1 and UE3.

A third embodiment of the present invention provides a UE, including: a session establishing unit, adapted to establish a session with the UE2 under the control of the application server; a media adding request sending unit, adapted to send a media adding requested directed at the multimedia session to the application server, where the media adding request includes the identity of the UE3 and the media type of the media stream requested to be added.

A fourth embodiment of the present invention provides an application server, including:
a session control unit, adapted to control the UE1 to establish a multimedia session with the UE2;
a receiving unit, adapted to receive a media stream adding request of the UE1 which is directed at the multimedia session; where the media stream adding request includes the identity of the UE3 and media type of the media stream requested to be added; and
a media adding control unit, adapted to control the UE3 to establish the media stream of the media type with the UE2.

A fifth embodiment of the present invention provides a user equipment, including: a media adding request sending unit, adapted to send the request for adding the media stream between the application server and the UE2; where the request includes the type of the added media stream; a media stream establishing unit, adapted to establish the media stream of the added media type with the UE2 under the control of the application server;

A sixth embodiment of the present invention provides an application server, including:
a session control unit, adapted to control the UE1 to establish a multimedia session with the UE2;
a receiving unit, adapted to receive the media stream adding request sent by the UE3 to add the media stream between the UE3 and the UE2, where the request includes the media type of the added media stream;
a media stream adding unit, adapted to control the media stream of the media type established between the UE3 and the UE2.

The above is the detailed description of the method, UE and application server for adding media stream. In one embodiment of the present invention, the multimedia session is established between the UE1 and the UE2 under the control of the application sever; the UE1 sends to the application server a media stream adding request directed at the multimedia session, where the media stream adding request includes the UE3 identity and the media type of the media stream requested to be added; the UE3 establishes the media stream of the media type with the UE2 under the control of the application server. Therefore, adding the media stream on the UE3 is realized, the user may realize the multimedia session with the peer end through multiple UEs, thereby avoiding the inconvenience that the media stream can only be added to the two parties in the session and living up to the users' diversified requirements on the multimedia services.

Another embodiment differs from the above in that the UE3 initiates the media stream adding request, which is applicable for more scenarios; therefore, more approaches are provided for the media stream transfer to facilitate the using of the user.

It is apparent that those skilled in the art can make modifications and variations to the invention without departing from the spirit and scope of the invention. To summarize, the specification above is not intended to limit the protection scope of the present invention.

The invention claimed is:

1. A method, comprising:
receiving a request from a first user equipment (UE) to establish a media session with the first UE and a second UE, wherein the first UE is associated with a first identifier (ID);
establishing the media session with the first UE and the second UE;
receiving an adding request to add a third UE to the media session, wherein the third UE is associated with the first ID; and
adding the third UE to the media session,
wherein the media session comprises a first media type received from the first UE and a second media type received from the third UE, and
wherein the first media type and the second media type comprise different media types.

2. The method of claim 1, wherein the first UE and the third UE comprise different terminal devices supporting different media streams.

3. The method of claim 1, wherein the first media type comprises video, and wherein the second media type comprises audio.

4. The method of claim 1, wherein the adding request is received from the first UE.

5. The method of claim 1, wherein the adding request is received from the third UE.

6. The method of claim 1, wherein the first ID comprises a user name.

7. The method of claim 1, wherein the first ID comprises an electronic mail address.

8. The method of claim 1, wherein the first ID comprises a nickname.

9. An electronic device, comprising:
a memory configured to store instructions; and
a processor coupled to the memory and configured to execute the instructions to cause the electronic device to:
receive a request from a first user equipment (UE) to establish a media session with the first UE and a second UE, wherein the first UE is associated with a first identifier (ID);
establish the media session with the first UE and the second UE;
receive an adding request to add a third UE to the media session, wherein the third UE is associated with the first ID; and add the third UE to the media session, wherein the media session comprises a first media type received from the first UE and a second media type received from the third UE, and wherein the first media type and the second media type comprise different media types.

10. The electronic device of claim 9, wherein the first UE and the third UE comprise different terminal devices supporting different media streams.

11. The electronic device of claim 9, wherein the first media type comprises video, and wherein the second media type comprises audio.

12. The electronic device of claim 9, wherein the adding request is received from the first UE.

13. The electronic device of claim 9, wherein the adding request is received from the third UE.

14. The electronic device of claim 9, wherein the first ID comprises a user name, an electronic mail address, or a nickname.

15. The electronic device of claim 9, wherein the electronic device comprises an application server, and wherein the application server is communicatively coupled to the first UE, the second UE, and the third UE.

16. A computer program product comprising instructions for storage on a non-transitory computer-readable medium that, when executed by a processor, cause an electronic device to:

receive a request from a first user equipment (UE) to establish a media session with the first UE and a second UE, wherein the first UE is associated with a first identifier (ID);

establish the media session with the first UE and the second UE;

receive an adding request to add a third UE to the media session, wherein the third UE is associated with the first ID; and add the third UE to the media session, wherein the media session comprises a first media type received from the first UE and a second media type received from the third UE, and wherein the first media type and the second media type comprise different media types.

17. The computer program product of claim 16, wherein the first UE and the third UE comprise different terminal devices supporting different media streams.

18. The computer program product of claim 16, wherein the first media type comprises video, and wherein the second media type comprises audio.

19. The computer program product of claim 16, wherein the adding request is received from the first UE or the third UE.

20. The computer program product of claim 16, wherein the first ID comprises a user name, an electronic mail address, or a nickname.

* * * * *